United States Patent Office 3,393,947
Patented July 23, 1968

3,393,947
TWO-DIRECTIONAL AXIAL THRUST BALANCER
James J. Sandy, Jr., Lake Park, Fla., assignor to United Aircraft Corporation, East Hartford, Conn., a corporation of Delaware
Filed Apr. 13, 1966, Ser. No. 542,386
5 Claims. (Cl. 308—160)

This invention relates to a fluid thrust balancing system which will balance thrust forces on a shaft to maintain said shaft in a desired axial position.

An object of this invention is to provide a thrust balancer for a shaft which will provide shaft stability while permitting a high thrust load.

Another object of this invention is to provide a thrust balancer which will require a low flow of operating fluid for satisfactory operation.

A further object of this invention is to provide a thrust balancer between two members with piston faces on one member each of which cooperates with a face on the second member to form a chamber having a fixed operating fluid inlet and variable outlet.

Another object of this invention is to use a fluid with a high bulk modulus so that it is desirable to operate at high pressure and low temperatures.

A further object of this invention is to provide a thrust balancer which will balance thrust imparted to a shaft from either direction.

Other objects and advantages will be apparent from the specification and claims and from the accompanying drawings which illustrate embodiments of the invention.

FIGURE 3 is an enlarged view of a portion of the thrust balance plate and disks of FIGURE 1.

Figure 1:
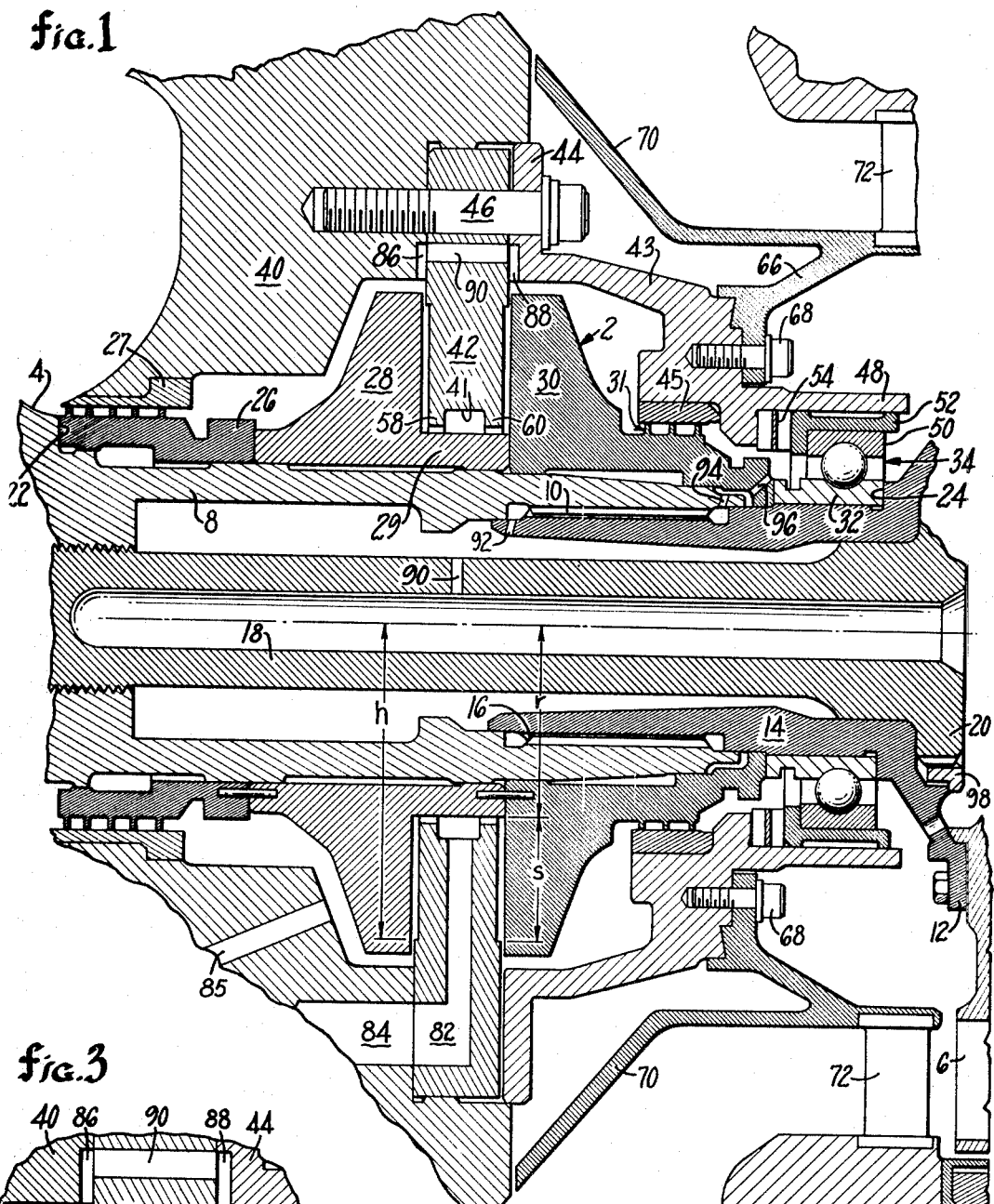
FIGURE 1 is a sectional view showing a thrust balancing system mounted between a shaft and housing wherein the plate or piston is fixed to the housing.

As viewed in FIGURE 1, the thrust balancing system 2 is located between a pump impeller 4 and turbine blades 6. The pump impeller 4 includes a hollow shaft section 8 which extends outwardly therefrom and has an open end with internal splines 10. The turbine blades 6 have their roots bolted on to a flange 12 which has a hollow shaft section 14 extending therefrom having external splines 16 which engage splines 10 of shaft section 8. A tie bolt 18 having an enlarged head 20 which engages the bottom of a recess in the outer surface of the flange 12 of the shaft section 14, extends through shaft sections 14 and 8 to threadably engage the shaft section 8. This holds the two shaft sections together.

Located on the two shaft sections between an abutting face 22 on shaft section 8 and an abutting face 24 of the flange 12 are in order, (1) a five-lip labyrinth straight through seal 26; (2) a first thrust balancing disk 28 having a spacing sleeve 29; (3) a second thrust balancing disk 30 combined with a three-lip labyrinth straight through seal 31; and (4) the inner race 32 of a bearing unit 34. Seal 26, disk 28 and disk 30 are pinned together to prevent relative movement therebetween.

A pump housing 40 extends over the first thrust balancing disk 28, seal 26 and pump impeller 4. The housing 40 encloses the pump impeller forming an inlet and outlet. An insert member 27 is supported by the housing 40 for engagement with the five lips of the seal 26. An annular thrust balancing piston or plate 42 has its outer end positioned in a notch formed in the face of the housing 40 with its inner end being positioned between the first thrust balancing disk 28 and the second thrust balancing disk 30. The inner surface 41 of the annular plate 42 is formed having annular flanges 58 and 60 projecting radially inwardly with their inner surfaces being spaced a predetermined distance from the spacing sleeve 29 to form inlet means to be referred to hereinafter. The location of these parts will also be more specifically discussed later.

A housing extension and support member 43 has an outwardly extending flange 44 which is placed against the open outer side of the annular thrust balancing plate 42 with bolts 46 affixing said flange and plate to the housing 40. The extension 43 supports an insert member 45 which mates with the three lips of the seal 31. The extension also includes a cylindrical sleeve 48 which projects over the inner race 32 of the bearing unit 34. This sleeve supports the outer race 50 of the bearing unit 34 in an annular movable sleeve member 52 which is biased into position by a wavey spring member 54. The pump impeller of the shaft section 8 has a shaft section (not shown) having a similar bearing unit and spring member located between the housing and the shaft section but acting in the opposite direction from bearing unit 34 and spring member 54. The action of the spring members is to center the plate 42 between the disks 28 and 30 when the mechanism is at rest.

A turbine housing 66 is fixedly mounted to the housing extension and support member 43 by bolt 68. This turbine housing provides an inlet 70 to the turbine blades 6 with stators 72 for directing flow into said blades.

As viewed in FIGURE 3, the thrust balancing plate 42 which projects inwardly from the housing assembly 40, 43, 66 has the annular flange 58 of such a length to provide an opening between the flange and the spacing sleeve 29 having a fixed area $A_3$ and the annular flange 60 of such a length to provide an opening between the flange and the spacing sleeve 29 having a fixed area $A_1$. The side of the thrust balancing plate 42 facing the disk 28 is constructed having an annular recessed face 79 extending from the inner end of the plate 42 outwardly to a point 78 adjacent the outer edge of the disk 28, forming a chamber. When the plate at point 78 touches the outer end of the disk 28 the volume of the chamber indicated by $V_B$ is reduced to a predetermined minimum. The other side of thrust balancing plate 42 facing the disk 30 is constructed having an annular recessed face 81 extending from the inner end of the plate 42 outwardly to a point 80 adjacent the outer edge of the disk 30, forming a chamber. When the plate at point 80 touches the outer end of the disk 30, the volume of the chamber indicated by $V_A$ is reduced to a predetermined minimum.

When the disks 28 and 30 are positioned with the thrust balancing plate 42 equidistant therebetween, then:

$$V_B = V_A$$

and $A_2 = A_4$. As the thrust balancing disks 28 and 30 move axially, the disk 28 adjacent point 78 moves to vary the area at that point between a position approaching fully closed ($A_2=0$) and a position with the area approaching fully open ($A_2=$max.); and the disk 30 adjacent point 80 moves to vary the area at that point between a position approaching fully closed ($A_4=0$) and a position with the area approaching fully open ($A_4=$max.). It can be seen that when $A_2$ is increasing, $A_4$ is decreasing, and when $A_2$ is decreasing, $A_4$ is increasing. The openings $A_1$ and $A_3$ remain the same area during axial movement of disks 28 and 30.

The thrust balancing plate 42 is constructed having a passageway 82 extending from adjacent its fixed outer edge radially inwardly to the annular groove formed between flanges 58 and 60. A passageway 84 in the pump housing has one end connected to the passage 82 of the plate and a high pressure source of operating fluid. This high pressure connection could be to the pump discharge of the pump housed in housing 40. One side of plate 42 is connected to the other side adjacent the outer periphery of disks 28 and 30 by a plurality of radial grooves 86 and 88 and a plurality of cooperating passageways 90 passing through said plate. A passageway 85 connects the space between the housing 4 and disk 28 to a low pressure for venting.

In a thrust balancing system constructed in accordance with FIGURE 1, the distance $h$ was 2½″ with $r$ equal to 1½″ and $s$ equal to 1″. The radial distance from the ends of projections 58 and 60 to the seal member sleeve was .005″. With plate 42 centered, the axial distance between the points 78 and 80 and the sides of the disks 28 and 30 was .009″ and the axial distance between the sides of the plate 42 and the sides of the disks 28 and 30 forming the volumes $V_A$ and $V_B$ was .013″. In this construction, the area of each outlet $A_2$ and $A_4$ was made twice the size of the area of each inlet $A_1$ and $A_3$. The passageway 84 was connected to the pump discharge of pump impeller 4 and the interior of the housing 40 was connected to an intermediate pressure of the pump through passageway 85. The actual pressure in passageway 84 was 4500 p.s.i. and the pressure in passageway 85 was 50 p.s.i.

For lubrication, a lubricant can be directed into the hollow bolt 18 where it can pass through openings 90 to the interior of shaft sections 8 and 14, from there it can pass through openings 92 and splines 10 to passageways 94 and 96. At this point the lubricating fluid is sprayed on to the bearing unit 34. The other end of shaft section 8 is supported by bearing means as referred to before. A lock-ring 98 is provided to maintain the tie bolt 18 in place by engaging head 20 and flange 12 of shaft section 14.

*Operation*

As can be seen from this description when an unbalance force moves the shaft to the left as viewed in FIGURES 1 and 3, the area of the outlet $A_4$ closes and the area of $A_2$ opens causing the pressures in the volumes $V_A$ and $V_B$ to approach 4500 p.s.i. and 50 p.s.i., respectively. This difference in pressure across plate 42 results in a counterbalancing force to the right that restores the shaft to its original position. Conversely, when a force is applied to the right, a restoring force would be created in the opposite direction to again reposition said shaft.

Figure 2:
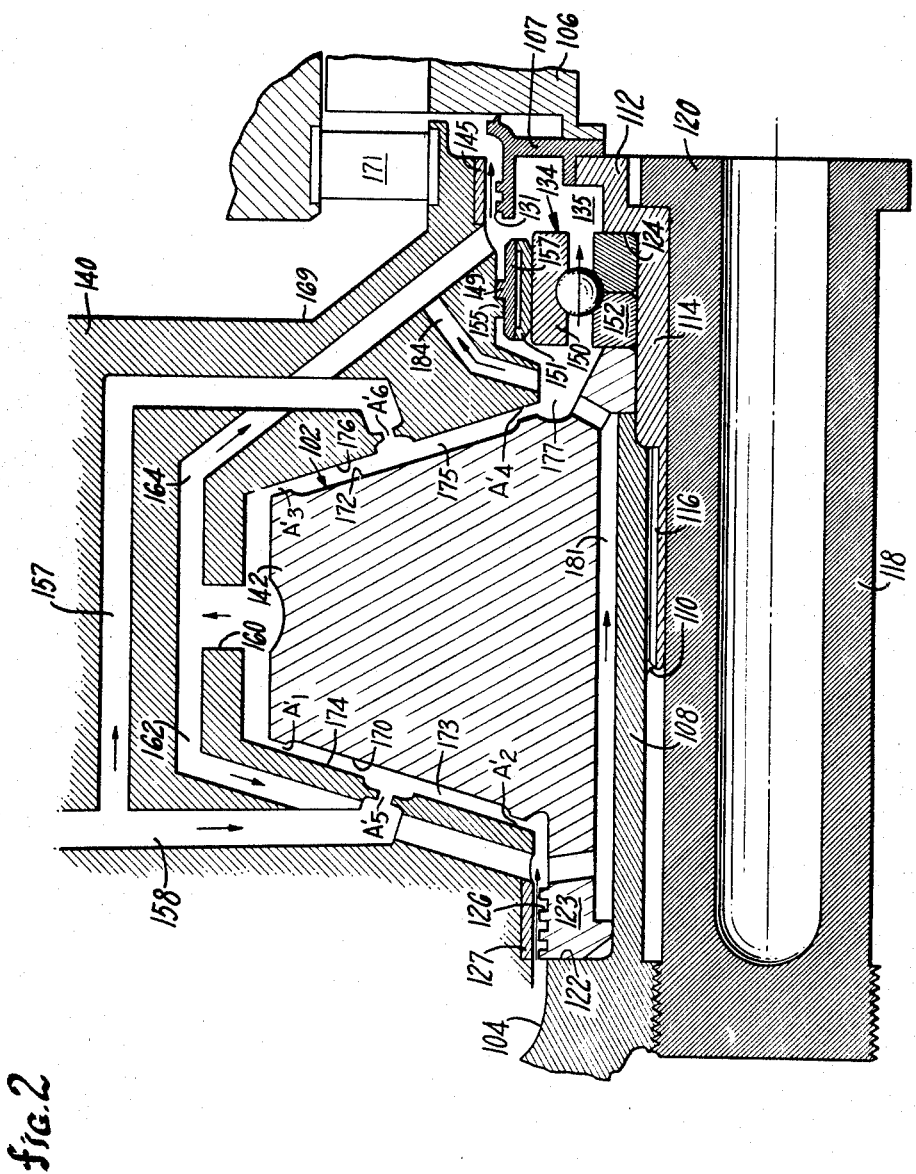
FIGURE 2 is a schematic view showing a thrust balancing system mounted between a shaft and housing wherein the plate or piston is fixed to the shaft.

As viewed in FIGURE 2, the thrust balancing system 102 is located between a pump impeller 104 having blades and turbine blades 106. The pump impeller 104 includes a hollow shaft section 108 which extends outwardly therefrom and has an open end with internal splines 110. The turbine blades 106 have their roots fixed to an annular seal member 107 which is, in turn, fixed to a flange 112 which has a hollow shaft section 114 extending therefrom having external splines 116 which engage splines 110 of shaft section 108. A tie bolt 118 having an enlarged head 120 which engages the bottom of a recess in the outer surface of the flange 112 of the shaft section 114, extends through shaft sections 114 and 108 to threadably engage the shaft section 108. This holds the two shaft sections together.

Located on the two shaft sections between an abutting face 122 on shaft section 108 and an abutting face 124 on the outwardly extending flange 112 are in order, (1) an annular thrust balancing plate or piston 142, the forward part of the plate has a sleeve projection 123 which has a four-lip labyrinth straight through seal 127 located thereon and the rearward part of the plate has a section of reduced diameter which engages shaft section 114, and (2) the two-part inner race 152 of a bearing unit 134.

Housing means 140 extends over the pump, turbine and thrust balancing system. The housing also provides an inlet 169 to the turbine blades 106 with stators 171 being positioned to direct flow into said blades. An insert member 127 is supported by housing 140 for engagement with the four lips of the seal 126. At this point between the housing 140 and pump impeller 104, a pressure is introduced which will prevent a leak from within the balancer. This can be connected to some interstage pump pressure. Housing 140 also supports the outer race 150 of the bearing unit 134 by an annular U-shaped member 151 which contacts said outer race and permits its movement when necessary, and an annular flat member 155 which contacts the outwardly extending arms of the U-shaped member 151. Member 155 is provided with an annular stop 149 which engages a stop 159 on the housing. When positioned in the housing, the two members 151 and 155 are fixed relative to each other and to the housing. The annular seal member 107 affixed to the flange 112 has a two-lip labyrinth straight through seal 131 while the housing 140 supports an insert member 145 which mates with the two lips of seal 131. This seal permits flow from the thrust balancing system to vent.

The thrust balancing plate 142 has two side faces 170 and 172 with an annular projection circumferentially encircling the outer end of each face, and an annular projection circumferentially encircling the inner end of each face. Housing means 140 has an annular face 174 located parallel to and spaced from face 170 and an annular face 176 located parallel to and spaced from face 172. The faces 170 and 174 form an annular chamber 173 with the cooperating projections of face 170, and the faces 172 and 174 form an annular chamber 175 with the cooperating projections of face 172. These projections are arranged to mate with a cooperating face 174 or 176 on the housing 140 with each pair of projections acting as a variable area outlet when the thrust balance plate or piston is moved axially with respect to the housing. The variable area outlets for chamber 173 are designated $A'_1$ and $A'_2$ and the like outlets for chamber 175 are designated $A'_3$ and $A'_4$, respectively.

Conduit means 157 and 158 direct an operating fluid to fixed inlet openings, $A'_5$ and $A'_6$ which in turn direct the fluid into the chambers 173 and 175, respectively. A plurality of these openings $A'_5$ and $A'_6$ are located around each face 174, 176 of said housing positioned adjacent the faces 170 and 172, respectively, of the plate 142.

Operating fluid from the operating chambers 173, 175 passes out the outer edge of the space in which the balance plate is located, by a conduit 160 which is, in turn, connected to two conduits 162 and 164. Conduit 162 is connected to a point adjacent the sleeve projection 123 and the other conduit 164 is connected to the space 135 between bearing 134 and seal 107.

Passageways 181 are located in the base of the thrust balance plate to direct fluid in the thrust balance system from the pump side adjacent the sleeve projection 123 to the chamber 177 on the turbine side which is, in turn, connected to bearing 134 and passageway 184. From chamber 177 fluid passes through the bearing 134 and passageway 184 to the chamber 135. The chamber 135 is connected to vent through the seal 131. When plate or piston 142 is positioned equidistant between faces 174 and 176 then $A'_1 + A'_2 = A'_3 + A'_4$ and the volume of chamber 173 equals the volume of chamber 175. As the thrust balancing plate 142 moves axially to the left, $A'_1$ and $A'_2$ approach zero and $A'_3$ and $A'_4$ approach a maximum. When the thrust balance plate moves in the opposite direction, $A'_3$ and $A'_4$ approach zero and $A'_1$ and $A'_2$ approach a maximum. Here again, the openings $A'_5$ and $A'_6$ remain fixed during axial movement of plate 142.

In a thrust balancing system constructed in accordance with FIGURE 2, the axial distance between the faces 170 and 172 and the faces 174 and 176, respectively, was .010″ and there were sixteen inlet openings $A'_5$ and $A'_6$. The outer projections forming the outlet opening $A'_1$ and $A'_3$ were located 3.33″ from the center line and the inner projections forming the outlet openings $A'_2$ and $A'_4$ were located 1.88″ from the center line. In this construction, the area of each outlet, at a small portion of the plate, $A'_1+A'_2$ and $A'_3+A'_4$, was made twice the size of the area of each inlet $A'_5$ and $A'_6$.

It is to be understood that the invention is not limited to the specific description above or to specific figures shown, but may be used in other ways without departure from its spirit as defined by the following claims.

I claim:

1. In combination, a housing, shaft means mounted for rotation in said housing, said housing having plate means extending therefrom inwardly and having an opening through which said shaft means passes, radial bearing means spaced axially outwardly from said plate means to support said shaft means, said shaft means having two thrust balancing disks extending radially outwardly therefrom and being positioned one on each side of the plate means of said housing, the opening of said plate means having a circular end face spaced from said shaft means, said face having a groove therearound forming an annular projection on each side thereof, said projections extending to within a short distance radially of the shaft means, means for supplying an operating fluid to the groove located in the face of the opening of said plate means, each side face of said plate means being formed so that the thickness of the plate means is greater at the point where it is adjacent to the outer ends of the thrust balancing disks, said disks being spaced apart to provide a chamber on each side of said plate means with each of said disks, each chamber having an inlet of fixed area for an operating fluid between the cooperating annular projections and shaft means and a variable area outlet formed by the cooperating side face of the plate means with the cooperating disk.

2. In combination: housing means; shaft means mounted for rotation in said housing means; thrust balance means located between said housing means and said shaft means to limit axial movement therebetween; said thrust balance means including: thrust balance plate means extending from one of said means toward the other, said plate means having a first annular face on each side at an angle to the axis of said shaft means, means extending from the other of said means having two second annular faces, one each spaced a distance from each first annular face of said plate means for providing a chamber therebetween, means located between each cooperating first and second annular faces to provide a variable area outlet from the chamber between each pair of annular faces as said shaft means and housing means have relative axial movement, means for directing an operating fluid into each chamber having a fixed area inlet; radial bearing means located between said housing means and said shaft means to support said shaft means and permit relative axial movement between said housing means and said shaft means, said radial bearing means being spaced axially outwardly from said plate means, said radial bearing means including: an inner and outer race, said inner race being fixed to the shaft means, and said outer race being mounted for axial movement in said housing means.

3. A combination as set forth in claim 2 wherein biasing means act on said outer race to position said first annular faces with relation to said second annular faces.

4. A combination as set forth in claim 2 wherein the outlet area from a chamber, when each first annular face is spaced an equal distance from its cooperating second annular face, is equal to approximately twice the inlet area to a chamber.

5. A combination as set forth in claim 1 wherein there are means biasing said shaft means so that each disk is equally spaced from its cooperating side of said plate means when no fluid pressure is acting on said disks.

References Cited

UNITED STATES PATENTS

| | | | |
|---|---|---|---|
| 1,607,318 | 11/1926 | Spillmann | 308—170 |
| 3,132,903 | 5/1964 | Webb | 308—170 |
| 3,223,463 | 12/1965 | Porath | 308—122 |

MARTIN P. SCHWADRON, *Primary Examiner.*

FRANK SUSKO, *Assistant Examiner.*